United States Patent [19]

McCabe

[11] 4,080,978

[45] Mar. 28, 1978

[54] SMOKE, FIRE AND AIR CONTROL DAMPER

[76] Inventor: Francis J. McCabe, 239 Hastings Ct., Doylestown, Pa. 18901

[21] Appl. No.: 771,473

[22] Filed: Feb. 24, 1977

Related U.S. Application Data

[63] Continuation-in-part of Ser. No. 689,994, May 26, 1974.

[51] Int. Cl.2 ........................ E05F 15/20; F24F 13/14; F16K 1/22

[52] U.S. Cl. ........................................... 137/79; 49/2; 98/110; 137/601; 160/6; 236/49

[58] Field of Search ......................... 49/2, 7, 8, 87, 88, 49/89, 91, 92; 98/110, 112, 113, 121 A, 86; 126/287.5; 137/75, 76, 77, 79, 80, 601; 160/1, 6; 169/42; 251/308; 236/49, 90

[56] References Cited

U.S. PATENT DOCUMENTS

| | | | |
|---|---|---|---|
| 3,260,018 | 7/1966 | Schuh | 98/86 X |
| 3,312,159 | 4/1967 | Shepard | 126/287.5 X |
| 3,889,314 | 6/1975 | McCabe | 49/2 X |
| 3,960,065 | 6/1976 | McCabe | 160/1 X |
| 3,996,952 | 12/1976 | Root | 137/601 X |

*Primary Examiner*—Robert G. Nilson

*Attorney, Agent, or Firm*—Benasutti Associates, Ltd.

[57] ABSTRACT

A rotating blade, smoke, fire and air control damper with spring closures attached on both inside and outside surfaces of the blades is disclosed. The spring closures cooperate with a bimetallic heat sensing device to trigger the closing of the blades at a predetermined temperature.

14 Claims, 6 Drawing Figures

SMOKE, FIRE AND AIR CONTROL DAMPER

CROSS REFERENCE TO RELATED APPLICATIONS

This application is a continuation-in-part of my prior copending patent application Ser. No. 689,994, filed May 26, 1976 entitled, "Rotating Blade Fire Damper" which application is incorporated by reference as if fully set forth herein.

BACKGROUND OF THE INVENTION

The present invention relates generally to the field of air control dampers, and more particularly, to those air control dampers which are intended to regulate the volume of air passed along a duct or plenum, or through an opening, in which the damper is further adapted to prevent the passage of smoke or fire therethrough when the damper is in the closed position. For discussions of some of the problems encountered in the fire, smoke and air control damper field, please refer to my previously issued U.S. Pat. Nos. 3,381,601; 3,204,548; 3,605,603; and 3,899,156.

In particular, a suitable fire, smoke and air control damper should be easily operable to allow the flow of air therethrough in any of a desired number of predetermined settings between the closed and open positions of the blades with respect to the frame. With respect to the fire and smoke control aspect of such a damper, it is also important that a damper be capable of withstanding intense heat and/or air pressures which impinge on either side of the damper for substantial periods of time during a fire. Due to the extreme conditions to which such a damper is subjected, it is necessary to provide extremely strong blades and a very substantial frame which, together, form a tight, positive seal to effectively shut off the air duct, opening, or plenum. In fact, due to the deficiencies experienced by some practitioners in this field, folding blade fire dampers such as those illustrated in my previously issued U.S. Pat. Nos. 3,866,656; 3,866,657; 3,814,165; 3,401,734; 3,727,663; 3,327,764; and 3,273,632 have been utilized in order to overcome those deficiencies otherwise encountered by some devices utilizing a plurality of rotating blades, each of which blades must form a seal with an adjacent blade as well as the frame, which seal is sometimes prone to leakage in the event that extremely precise alignments and tolerances are not maintained. This problem has been aggravated by the fact that a smoke and fire damper must function effectively in a relatively dirty environment years after it has been installed.

Prior art rotating blade fire and smoke dampers have, therefore, incorporated extremely heavy materials which are not subject to easy bending or deformation in the presence of heat. The blades are mounted by distinct hinge or pivot means which are separately installed for the purposes of aligning each of the blades for rotational movement and to insure the interengagement of each blade with its adjacent blade to form a seal therebetween which does not open in the presence of heat or excessive pressures, such as those which might be encountered during a fire.

It is sometimes desirable to provide dampers with springs for forcing the blades of a folding blade or single blade damper to the closed position. My previously issued U.S. Pat. Nos. 3,899,156; 3,866,657; 3,814,165; and 3,401,734 illustrate various uses of springs in this regard. Spring closure devices, when they are used, are normally mounted at one end of the frame to pull curtain-type folding blade closures thereacross, or on one side of a single blade to cause that blade to engage a locking clip to lock in the closed position. Springs have not generally been used (in the absense of a locking device) to directly restrain the devices against fire since heat will tend to cause the spring to loose its strength, and thus its effectiveness.

SUMMARY OF THE INVENTION

A rotating blade, smoke fire and air control damper is disclosed with spring closure means attached to both inside and outside surfaces of the two end most blades in the series of blades. The spring closure means acts with opposing forces through the blade linkage to "snap" close the blades and to retain the blades in that position even in the presence of fires. The springs are mounted on bracket supports attached to inner and outer blade surfaces with the free ends thereof attached to opposing alternate ends of the frame. By applying closure forces in this manner problems of binding, incomplete closure and closure retention are overcome.

The spring closures cooperate with a heat responsive means to trigger the closing of the blades at a predetermined temperature. The heat responsive means, which is preferably a bimetallic link, is attached by suitable means to a linkage means which is utilized for articulating the positions of a plurality of blades with respect to each other during the rotation thereof. The use of such a link, which may be mounted to automatically reset when recycled, makes possible the use of springs of sufficient strength to effectively withstand fire conditions.

Accordingly, a primary object of the present invention is the provision of a rotating blade fire and smoke damper with superior automatic closing characteristics.

Another object of the present invention is the provision of a rotating blade fire and smoke damper with a plurality of spring closure means disposed on opposing surfaces of the blades to automatically move the blades to the closed position.

It is another object of the present invention to provide for a rotating blade, fire damper which utilizes said spring closure members applying a force in opposing directions to the end most blades of a linkage articulated chain of blades to snap close the blades of the damper in response to the triggering.

Another object of the present invention is the provision of a rotating blade fire damper with spring closure members which cooperate with heat responsive means for automatically closing the blades at a predetermined temperature.

This and other objects of my invention will become apparent from the following description with reference to the accompanying drawings.

DETAILED DESCRIPTION OF THE DRAWINGS

Figure 1:
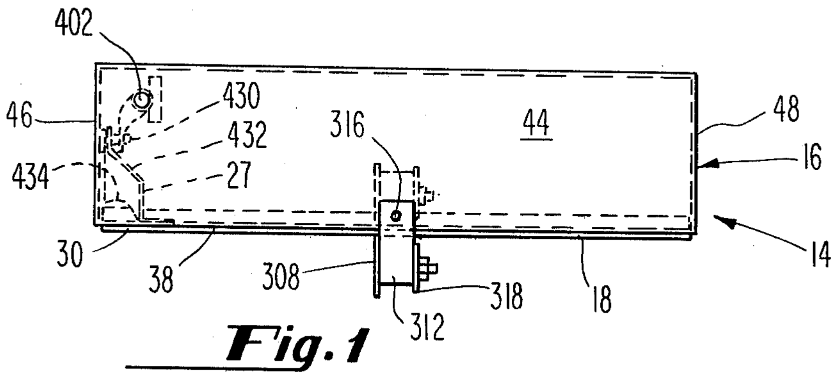
FIG. 1 is a top view of the preferred embodiment of the present invention showing a spring closure member attached to the top of the frame and mounted on the upper and outer surface of the top blade of the damper. The other spring closure member being shown in dotted outline.

Although specific forms of the invention have been selected for illustration in the drawings, and the following description is drawn in specific terms for the purpose of describing these forms in the invention, this description is not intended to limit the scope of the invention which is defined in the appended claims.

Figure 2:
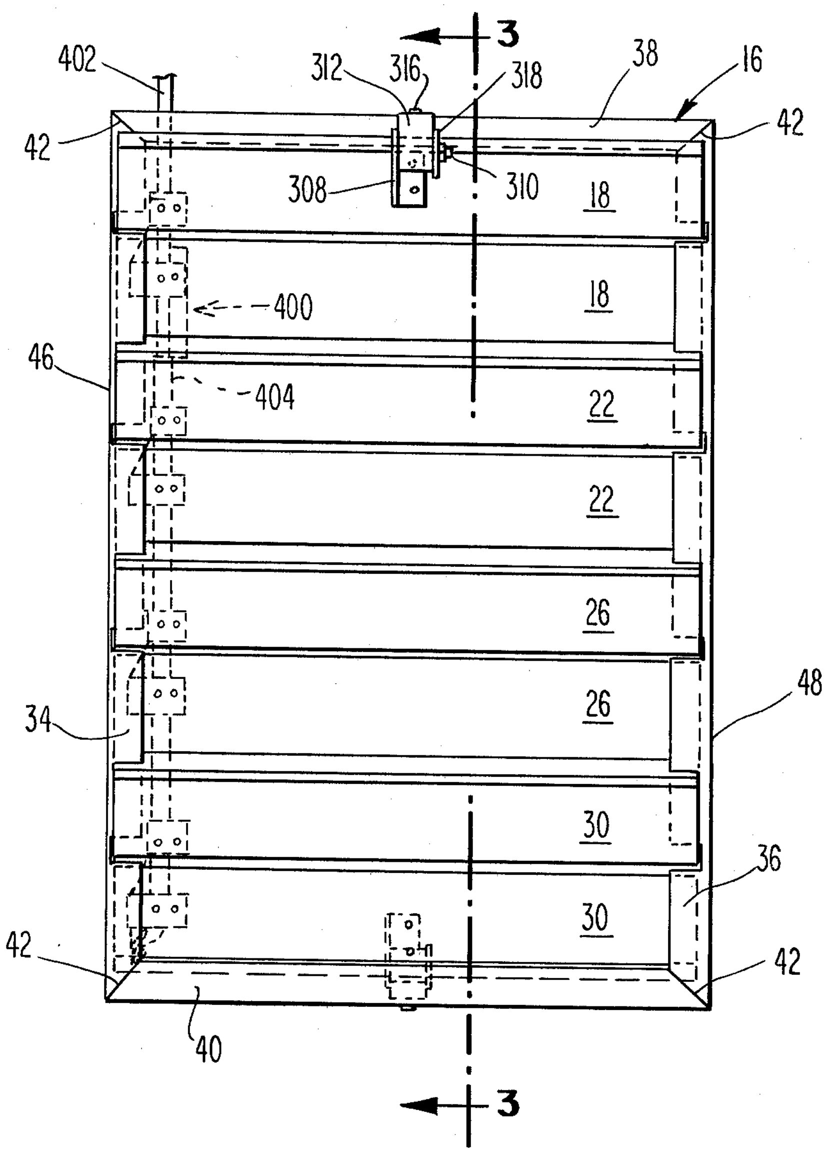
FIG. 2 is a front view of the preferred embodiment of the present invention which is illustrated in FIG. 1.

Referring now to all the figures, and in particular, to FIGS. 1 and 2, the damper of the present invention in its preferred embodiment is a generally rectangular damper for disposition in an opening which is not shown. The damper, designated generally 14 in the drawings, comprises a frame designated generally 16 and a plurality of blades 18, 22, 26, and 30. The frame designated generally 16 comprises inwardly depending flanges 34 and 36 which are disposed on opposite sides of the frame 16 in a plane which is substantially parallel to the plane of the blades 18, 22, 26, and 30 in the closed position. Additional inwardly depending flanges 38 and 40 are also formed in this plane at the top and bottom of the frame. The first of the aforementioned inwardly depending flanges 34 and 36 (the side flanges) are adapted to form a seal with the ends of blades, while the last of the aforementioned inwardly depending flanges 38 and 40 form seals with top and bottom blades 18 and 30 when those blades are in the closed position. In constructing frame 16 the appropriate portions of the inwardly depending flanges 34, 36, 38, and 40 are notched so that when folded into the aforementioned plane, a butt seal is formed at intersections 42 which can be welded for a tighter seal and more rigidity. The frame designated generally 16 further comprises a top 44, a bottom, and sides 46 and 48 which extend generally perpendicularly to inwardly depending flanges 34 and 36 respectively. The construction and assembly of the frame is generally similar to that described in my previously issued U.S. Pat. No. 3,833,989 entitled "Method Of Fabricating And Assembling A Damper," which patent is specifically incorporated herein by reference.

Figure 3:
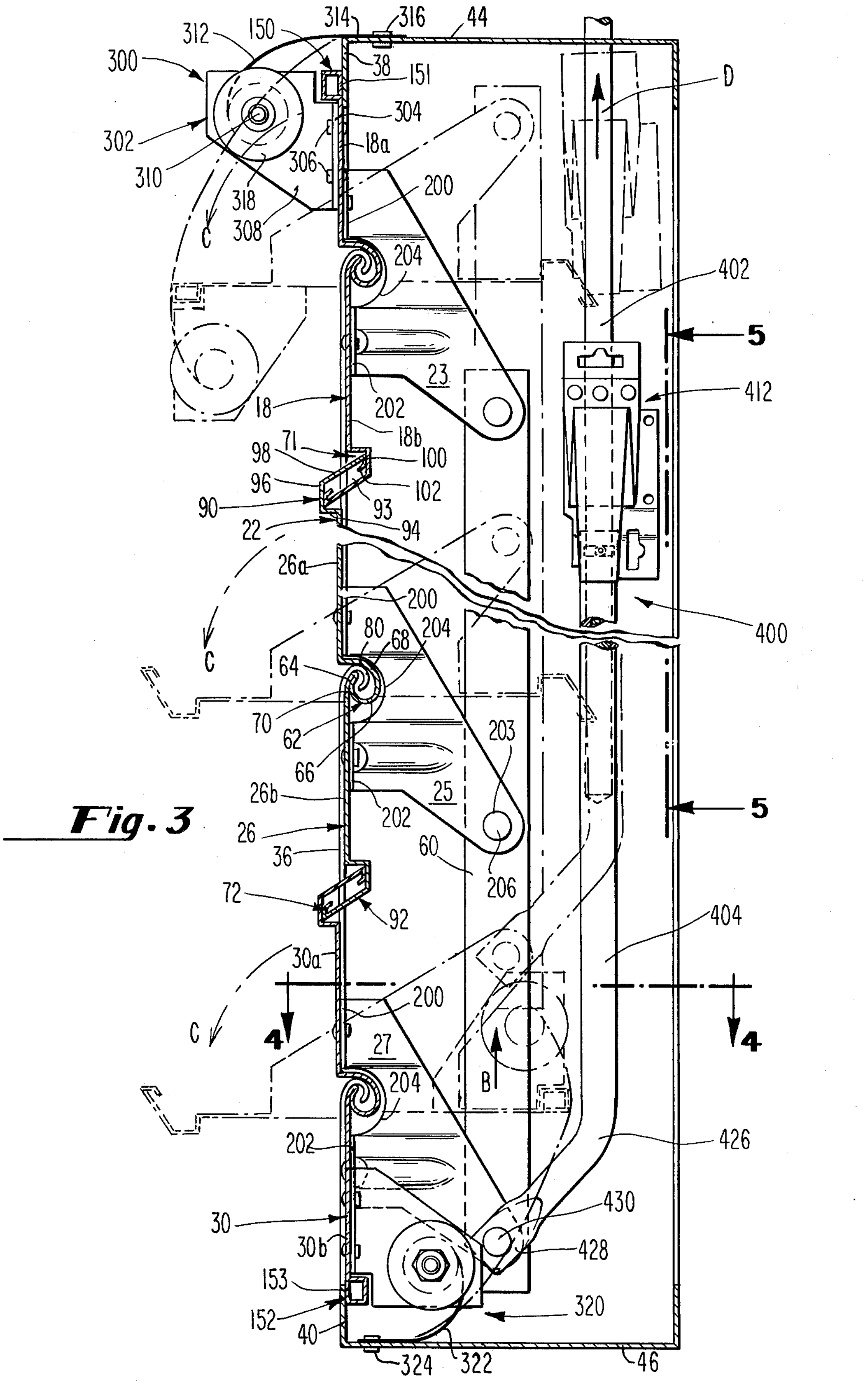
FIG. 3 is a greatly enlarged foreshortened cross-section of a portion of the preferred embodiment of the present invention illustrated in FIG. 2, taken as indicated by the lines and arrows 3—3 in FIG. 2, and further wherein the open position of the blades with respect to the frame is shown in phantom.

Referring now to FIG. 3, which is a cross-section of a portion of the preferred embodiment shown in FIG. 2, the relative open and closed positions of the blades are shown. Blades 18 and 30 and a portion of blades 22 and 26 are shown disposed in the closed position with respect to inwardly depending flange 36. In a phantom view, blades 18, 26, and 30 are rotated to the open position, which opening is accomplished by movement of rod 60 along the axis as indicated by arrow B in FIG. 3 to the phantom position.

Referring now specifically to the blade configuration utilized in the preferred embodiment of the present invention, the blade designated generally 26 has disposed intermediate between the two longitudinal edges thereof a hinge portion designated generally 62. This hinge portion may be roll formed in the blade extending longitudinally across its length. Hinge portion 62 generally comprises hinge tip 64, rounded portion 66, blade offset 68 and overlapping portion 70. For a similar roll formed hinge portion, please refer to my previously issued U.S. Pat. No. 3,908,529, which discloses a back-draft damper with a particular blade frame hinging interaction, which patent is also specifically incorporated herein by reference.

As seen in FIG. 3, each blade, such as blade 26, is defined by the hinge portion designated generally 62 into two distinct sections: the first is outer blade section *26a* disposed between the hinge portion designated generally 62 and a first blade tip, which is not shown for blade 26 since FIG. 3 is foreshortened across blade 26. However, the first blade tip designated generally 71 of blade section *22a* of blade 22 is shown and this is identical with the first blade-tip configuration of blade 26. An inner blade section *26b* which is disposed generally between the hinge portion designated generally 62 and second blade-tip designated generally 72 makes up the second distinct blade section. As clearly illustrated in FIG. 3, the inner blade section *26b* and the outer blade section *26a* are parallel and slightly spaced apart, which spacing is generally established by the configuration of hinge portion 62 and in particular by the length of blade off-set 68. In the preferred embodiment as shown in FIG. 3, the outer blade section *26a* and inner blade section *26b* are spaced apart by a distance which is substantially equal to the thickness of the inwardly depending flange designated generally 36 in FIG. 3. Inwardly depending flange 36 is formed into a hook-shaped hinge element 80, which hinge element is formed by notching the appropriate portions of inwardly depending flanges 34 and 36 on opposite sides so that each of the hinge elements such as hook-shaped hinge element 80 are disposed on opposite sides of the frame for engagement in articulated rotational relationship with hinge portion 62 of each respective blade.

By so constructing each of the blades in a rotating blade fire damper so that a hinge portion is, as shown in FIG. 3, generally formed intermediate between the tips of the blade, and then by correspondingly off-setting each of two sections of that blade by the width of the associated inwardly depending flanges of that blade, it is possible to form an effective seal along the ends of each of said blades which are contiguous to said inwardly depending flanges. As shown in FIG. 3, inner blade section *26b* is firmly pressed up against the inner surface of inwardly depending flange 36. Following the blade downwards along flange 36, overlapping portion 70 of the hinge portion, designated generally 62, is seen to form a seal between it and the interior surface of the base of the hook-shaped hinge element 80, formed in the flange. Therefore, the inner blade section and the overlapping portion of the hinge portion 62 form a seal with the inner surface of inwardly depending flange 36, while the blade off-set 68 extends outwardly beyond the outer surface of inwardly depending flange 36 so that the outer blade section *26a* will, when the blade is in the closed position, form a seal between the blade and an outer surface of inwardly depending flange 36.

Another feature of the blades of the preferred embodiment damper is the unique sealing arrangement which is effected between adjacent blades along the portions of those blades adjacent to their longitudinal edges. Each adjacent longitudinal edge portion of said blade, designated generally 90, for blade 22 is formed into a hook-shaped configuration. Each of the hook-shaped configurations formed on these longitudinal edge portions open towards the inwardly depending flange 36. For example, outside longitudinal edge portion 90 of blade 22, which is the same as the outside longitudinal edge of blade 26 for purposes of discussion here, opens towards the inwardly depending flange 36. Similarly, inside longitudinal edge portion, designated generally 92, of blade 26 opens in the opposite direction from longitudinal edge portion 90 of blade 22, but nonetheless towards inwardly depending flange 36 due to the disposition of inner blade section 26*b* on the opposite side of inwardly depending flange 36. Each of the longitudinal end portions of a particular blade are formed into a plurality of portions which portions act to form a chamber or chambers 93 which are "dead air" chambers formed between the longitudinal edge portions of adjacent blades when those blades are in the closed position. Therefore, offsetting portion 94, extension portion 96, transvere portion 98 and tip 100 are formed to coact with the analogous portions on an adjacent blade in the closed position to form the aforementioned chamber 93. In particular, the function of offsetting portion 94 is to move the interior surface of extension portion 96 away from the plane of the contiguous section of the blade so that upon the slight misalignment and/or slight opening of the blades, the leading edge of the blade (i.e. the edge formed at the intersection of the transverse portion 98 and the tip 100) will move in an arc substantially parallel to the surface of the offsetting portion 94 so that a seal will be substantially maintained through an arc of the leading edge having a length of approximately one-half of the length of the offsetting portion. In alternate embodiments, the offsetting portion may be curved or otherwise shaped to more closely approximate the arc of the leading edge to thereby maximize the wiping action thereof. The length of the offsetting portion may similarly be varied depending upon the desired arc of blade rotation while maintaining the double seal between the blades. A serpentine air path will also be formed as the blades open slightly beyond said arc or in the event of leakage between the lading edge and the offsetting portions, which poses maximum resistance to air impinging on either side of the fire damper. As previously mentioned, a double seal is also formed between the tips 100 of adjacent blades and the interior surface of the extension portions 96 of adjacent blades, each of which is parallel to but spaced apart from the plane of their adjacent blades sections when the blades are in the fully closed position. Transverse portions 98 of adjacent blades are substantially parallel to each other when said blades are in the closed position, thereby imparting, together with the aforementioned portions, a cross-sectional configuration to chamber 93 which is a parallelogram having its shorter parallel sides formed by transverse portions 98. Spoilers 102 are additionally disposed on each of the tips 100 which act to increase the turbulence of the air which would tend to pass through the chamber 93 in the aforementioned serpentine fashion as the blades are moved as aforesaid. Thus, a double seal will exist as long as the tip 100 of one blade is disposed co-planar with or on the opposite side of the plane defined by the contiguous section of the adjacent blade.

Blade 18, like blades 22 and 26, is divided into two sections, outside section 18*a* and inside section 18*b*. Blade 18 has a hinge portion similar to that described for blade 26 and interacts with a hinge element of flange 36 in a similar way to that of blade 26. However, the outside surface 18*a* of blade 18 engages the outside surface of inwardly depending flange 38 and not an adjacent blade longitudinal edge. For this reason, the longitudinal edge 150 of blade section 18*a* does not have the characteristic hook-shape described for blade 26. Instead, the longitudinal edge 150 has a box-like shape. The outside surface of blade 18, namely 18*a* extends and overlaps the outside surface of flange 38 along the blade portion 151. Then the blade is bent in the box-shape shown and designated generally by 150. Similarly, the inside surface 30*b* of blade 30 has a longitudinal edge 152 which engages the inside surface of inwardly depending flange 40. Blade section 30*b* overlaps the inside surface of flange 40 along the blade portion 153. Hence, blades 18 and 30 form effective seals with the flanges 38 and 40 along the portions 151 and 153 respectively.

Referring now to the means for articulating the blades with respect to each other and with respect to the frame, blade engaging brackets 23, 25 and 27 are illustrated in in FIG. 3 and are seen to comprise base portions 200 and 202 which are offset to firmly engage the respective blade sections and are riveted thereto. Extending generally away from base portion 200 and 202 towards a fulcrum point 203 at which a pivot 206 is disposed, these blade engaging brackets are connected pivotally with linkage rod 60 so that upon movement of any one of the aforementioned blades or of the rod 60 along the axis as indicated by arrow B in FIG. 3, each of the blades moves to a position such as the position shown in phantom in FIG. 3 which has been referred to herein as "the open position" of the blades with respect to the frame. In this position, the relative proportions of the hook-shaped portions formed on the longitudinal edge portions 90 of each of the blades is seen to be relatively minor with respect to the width of the blades, thereby permitting air to freely pass through the damper when the damper is in the open position. Disposed between base portions 200 and 202 of each of the blade engaging brackets is an arcuate cut-out 204 which allows clearance for the aforementioned hinge portion designated generally 62 of each of the respective associated blades.

It is extremely desirable in many installations to have a means for automatically snapping the blades from the open position into the closed position in response to a particular condition. In FIG. 3, a plurality of biasing means which preferably comprise spring closure members are shown for accomplishing this purpose. Spring closure member, designated generally 300, is shown mounted or attached to the outside surface of section 18*a* of blade 18 and spring closure member 320, to the inside surface of section 30*b* of blade 30. The spring closure member 300 comprises a bracket support designated generally 302 having a base 304 which is mounted by rivets 306 to blade section 18*a* and which is substantially in the same plane as section 18*a*. A support member 308 extends away from the base portion 304 in a plane which is substantially perpendicular to the plane of the base member and blades. Mounted perpendicular to the support member and extending away therefrom but parallel to the rotational axis of the blade is shaft 310. A flat spring 312 is coiled around the shaft and attached at one end to the shaft 310 and attached at the other end 314 to the outside surface of the top 44 of the frame by rivet 316. The spring 312 is held on the shaft and against the support member by a retaining ring 318 mounted at one end of the shaft and fixed thereto. As the blade 18 is rotated to the open position in a direction shown by arrow C, the spring closure member 300 moves to the position shown in phantom in FIG. 3 unwinding the spring. The spring can be seen in phantom to extend over the longitudinal edge 150 of the blade 18 remaining attached by the rivet 316 to the top surface 44 of the frame. By extending the spring over the edge of the blade when the blade is in the open position, a maximum lever of moment arm is created on that blade through the initial rotation of that blade, including that phase of closure when the static friction and momentum of the blade must be overcome. As the blade nears the closed position, the fact that the spring member is disposed in spaced apart relation to the plane of its associated blade section causes the moment arm to shift to the axis bisecting the blade pivot and the spring member 300, thereby creating a whip-like action of the blade to drive the blade into the closed position. Since this action is applied at opposing ends of the blade chain, tendencies of the blades to jam are minimized. Hence, in the open position, the spring exerts a force on the blade 18 to close the blade against the frame, the force acting in a direction opposite to the arrow C.

At the opposite end of the frame, attached to the inside surface 30*b* of the blade 30 is an identical spring closure member designated generally 320. Spring member 320 is riveted to the inside surface of blade section 30*b* in a similar fashion to the mounting of spring closure member 300 to the outer surface of blade section 18*a*. The spring 322 of spring closure member 320 is riveted to the inside surface of the bottom 46 of the frame by rivet 324. When the blade 30 moves to the phantom position, the spring closure member 320 moves to the phantom position shown in FIG. 3 and the spring 322 extends in a similar fashion to that of spring 312 exerting similar forces on the blade 30 which are opposite to the force exerted by spring 312 on the blade 18. Both of these forces, though opposite in direction, tend to close the blades which are all connected to the linkage rod 60 moving the linkage rod 60 in the direction opposite arrow B in FIG. 3.

Hence, the preferred embodiment damper is equipped with two spring closure members, mounted on either side of the blades, which exert forces which are opposite in direction tending to move the blades towards the closed positions. This has an advantage during a fire in that regardless of which side of the blades the fire is on, one or the other spring closure member will remain effective if the high temperature of the fire destroys the spring closure member on the same side of the blades as the fire. Were this not the case, and the spring closure members were all mounted on the same side of the blades, a fire on that side of the blades could destroy the effectiveness of all spring closure members and render the damper useless.

It is sometimes desirable to maintain the damper blades in other than a closed position so long as the temperature of the air or atmosphere passing through the duct is below a given, predetermined or preselected temperature. However, should the temperature exceed the predetermined temperature, the damper operator should be released and the blades allowed to close automatically. In the preferred embodiment of this invention, such a capability exists through the co-operation of the spring closure members 300 and 320 previously described with a preferred embodiment operator means, designated generally 400 in FIG. 3.

Figure 5:
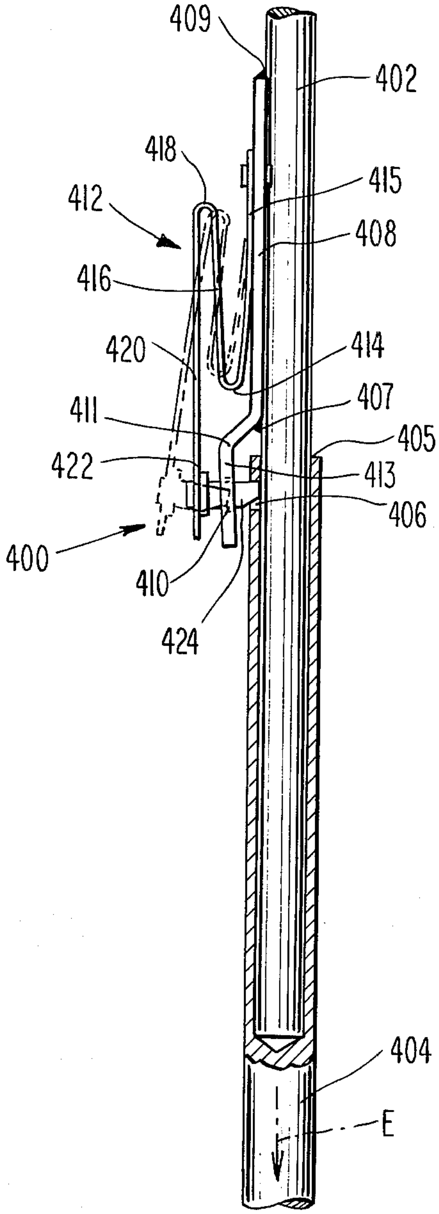
FIG. 5 is an enlarged view of a portion of the preferred embodiment heat releasing means of the present invention, taken as indicated by the lines and arrows 5—5 in FIG. 3, with a portion shown cut away, and with a bimetallic link shown in phantom in the open position.

FIG. 5 illustrated the various parts of the portion of the operator means taken as indicated by the lines and arrows 5—5 in FIG. 3. A long cylindrical rod 402 slides within a cylindrical, hollow tube 404. In FIG. 5, the tube is shown partially cut away to show the rod partially inserted into the tube through an open end 405 of the tube. The tube 404 has an aperture 406 in a side wall of the tube near the open end. Attached to rod 402, is positioning bracket 408 which is welded at welds 407 and 409 to rod 402. The bracket 408 extends for a distance along rod 402 (a distance as measured between weld 409 and 407 in this particular illustration) before curving away from the rod at weld 407. The bracket curves a second time at curved portion 411 into a terminal portion which is substantially parallel to the rod 402. The terminal portion 413 of the rod 402 has a hole 410 therethrough. The hole 410 is shown as hidden in FIG. 5 by dotted lines.

The operator mechanism 400 also comprises a heat responsive means which, in the preferred embodiment of FIG. 5, is a bimetallic serpentine member, designated generally 412. The first straight portion 415 of bimetal 412 is riveted to guide bracket 408 between the welds 407 and 409 and extends gradually away from the bracket until the first curved portion 414 of the bimetal is reached. Alternatively, guide bracket 408 may be eliminated and the bimetal 412 attached directly to rod 402. Extending from the first curved portion 414 is the second straight portion 416 of the serpentine shaped bimetal, which ends in the second curved portion 418. The third and last straight section 420 of the serpentine bimetal then extends adjacent and spaced apart from the lengths of the rod 402 and 404. The terminal portion 422 of the section 420 of the serpentine, bimetal extends to overlap the bracket terminal portion 413. The terminal portion 422 has a pin 424 connected thereto and extending substantially perpendicularly therefrom toward the bracket 408.

As can be seen from FIG. 5, when the rod 402 is inserted far enough into tube 404 so that the hole 410 in bracket 408 and the aperture 406 in tube 404 are substantially aligned, the pin 424 extends through hole 410 in the guide bracket 408 and aperture 406 in tube 404 to engage the side of rod 402. As the temperature of the atmosphere surrounding the bimetal 412 rises, the first straight section 415 bends to extend more and more away from the bracket and rod and the pin begins to withdraw from the aperture 406. If the temperature increases above a preselected temperature, the pin will be caused to withdraw completely from the aperture 406, a condition shown in phantom in FIG. 5, whereupon the tube will be free to move in the direction of arrow E shown in FIG. 5.

Referring to FIG. 3, the upper end of rod 402 extends through an aperture in the frame and is therefore suitably disposed to be engaged by a conventional damper actuator which not only opposes the forces applied by the springs but which may vary the position of rod 402 relative to the frame to thereby selectively control the volume of air which passes through the damper. Regardless of the location of rod 402, however, withdrawal of pin 424 from engagement of aperture 406 prevents the actuator from having any operative effect upon the blade positions, that is, until the bimetal returns to its normal position in response to a return of preferred ambient temperatures, at which time a recycling of the actuator through the position to fully close the blades will cause the device to reset by means of the taper 450 of pin 424 riding over the end of tube 404 and then into aperture 406, the taper 450 shown most clearly in FIG. 6.

The tube 404 is parallel to and spaced apart from the linkage rod 60 over most of its length until it curves inward at the opposite end of the tube from open end 405 toward the blades of the damper at curve portion 426 to end at a flat portion 428. The flat portion 428 is attached by a rivet 430 to the blade engaging bracket 27 and the linkage rod 60. With the rod 402 and tube 404 in the position shown in FIG. 5, the rod 402 is pulled by the actuator in a direction shown by arrow D in FIG. 3. Pulling the rod in the direction of arrow D also pulls the tube in that direction since pin 424 is positioned within the aperture 406 in a locked position. As the tube is moved, the linkage rod 60 moves in a substantially parallel direction shown by arrow B and this movement rotates all the blades such as 23, 25, and 27 from the closed position to the open position which is shown in phantom in FIG. 3. This movement of the rod 402, tube 404, rod 60 and blades, has all been done by the damper actuator against the action of the springs of the spring closures 300 and 320, thereby uncoiling the springs 312 and 322. The springs, therefore, are exerting equal and opposing forces at opposite ends of the frame, each tending to move the blades toward the frame in the closed position.

The blades will stay in the open position unless the temperature of the atmosphere passing through the damper increases above the predetermined or preselected temperature at which time the bimetal will react in the manner previously described thereby releasing the tube from engagement therewith and subject to the closing force of the springs. The blades will snap toward the frame to close, pulling the tube 404 in a direction opposite arrow D, but leaving the rod 402 and bimetal 412 in the position shown in phantom.

Figure 4:
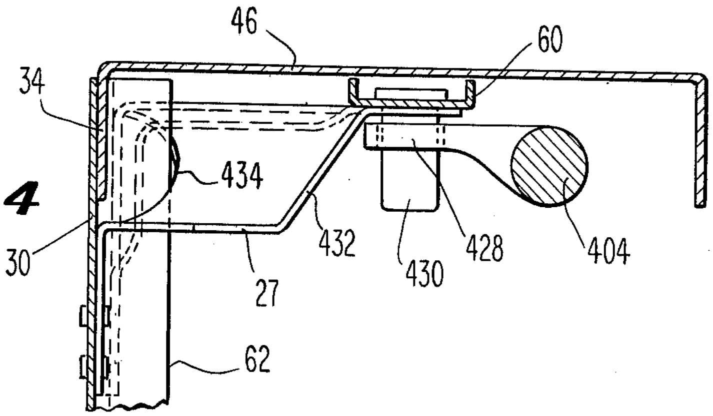
FIG. 4 is an enlarged cross-sectional view of a portion of the preferred embodiment as illustrated in FIG. 3, taken as indicated by the lines and arrows 4—4 in FIG. 3.

FIG. 4 is a more detailed illustration of a portion of tube 404 connected to the linkage rods 60 and taken as indicated by the lines and arrows 4—4 in FIG. 3. Shown in cross-section is wall 46, inwardly depending frame flange 34, blade 30, linkage rod 60 and tube 404. Blade engaging bracket 27 is shown connected to linkage rod 60 by rivet 430. Rivet 430 also passes through the flat portion 428 of tube 404. In order for the bracket 27 to engage both blade sections **30*a* and 30*b* of blade 30, the bracket has a diagonal portion 432 and a curved portion 434 which allows the bracket to curve around the hinge portion 62 of the blade 30**.

Figure 6:
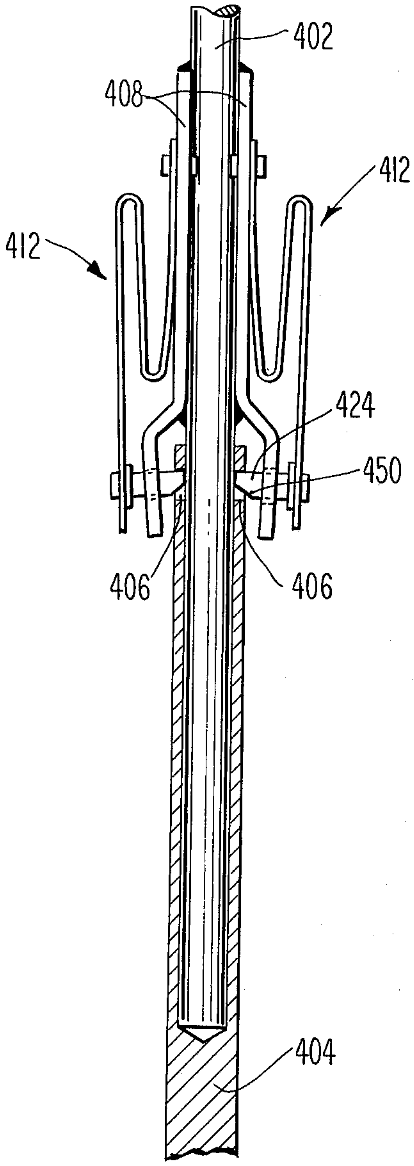
FIG. 6 is an alternate embodiment of the present invention shown in FIG. 5.

FIG. 6 shows an alternate embodiment of the operator means 400 of FIG. 5. The rod 402 is shown inserted in the tube 404 in the same manner as in FIG. 5 and two positioning brackets 408 and bimetallic links 412 are shown mounted on either side of the rod 402 in a similar way as shown in FIG. 5. The tube 404 has two apertures 406 near the open end of the tube instead of one to accommodate two bimetals 412.

The pin 424 in FIG. 6 shows the taper 450 of the end of the pin which aids in the aforementioned resetting feature.

It will be understood that various changes in the details, materials and arrangement of parts which have been herein described and illustrated in order to explain the nature of this invention may be made by those skilled in the art within the principle and scope of the invention as expressed in the following claims.

It will be further understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. A fire damper comprising:

(a) a frame;

(b) a plurality of blades associated with said frame;

(c) rotation means for allowing selective rotational displacement of said blades between closed and open positions with respect to said frame;

(d) linkage means for articulating the position of said plurality of blades with respect to each other and with respect to the frame during the rotation thereof; and (e) at least two biasing means for simulataneously forcing said blades from said open toward said closed position, said biasing means being located on opposite sides of said blades in said closed position.

2. The invention of claim 1 wherein each of said means is connected to separate ones of said plurality of blades to exert generally opposing forces thereon.

3. The invention of claim 2 wherein said plurality of blades comprises at least three blades, and wherein said biasing means are located to exert forces on the two endmost blades of said plurality of blades.

4. The invention of claim 3 wherein said biasing means extends over the edge of its associated blade when said blade is in the open position.

5. The invention of claim 4 wherein each of said biasing means comprises a support attached to its associated blade and a spring attached to said support at a point spaced apart from the plane of said blade, said spring being attached at its end remote from said support to said frame whereby the force applied by said spring to said blade in the closed position is directly applied through said support.

6. The invention of claim 1 wherein each of said blades comprises: parallel spaced-apart sections joined by at least one transverse connecting portion, each of said sections having a longitudinal edge and a rotational axis for rotational displacement between said closed position and said open position, said axis being parallel to said longitudinal edges; and wherein said damper comprises a plurality of biasing means being mounted on a first outer blade surface of a first of said sections of one of said plurality of blades located to engage a first end of said damper in said closed position, said biasing means acting upon said first end of said damper to urge said blade section theretoward; and a second one of said biasing means being mounted on the opposing inner surface of said second section of a second one of said blades, said second blade being located to engage an opposite end of said damper in said closed position, said second biasing means acting upon said opposite end of said damper to urge said blade section theretoward.

7. The invention of claim 6 wherein said rotational axis is substantially equidistance from each of said longitudinal edges.

8. The invention of claim 6 wherein each of said biasing means comprises a bracket support attached to its associated blade section and a spring attached at one end to said bracket support and at the other end to said frame, said spring passing over and engaging said longitudinal edge of said associated blade section when said blade is in the open position.

9. The invention of claim 1 wherein said damper further comprises operator means for moving said blades between the open and closed position.

10. The invention of claim 9 wherein said operator means further comprises heat responsive means for selectively disengaging at least a portion of said operator means, whereby said biasing means will cause said damper to move to the closed position.

11. The invention of claim 10 wherein said operator means is attached to said linkage means.

12. The invention of claim 10 wherein said operator means comprises a tube, a rod journalled within said tube, and at least one bimetallic element.

13. The invention of claim 12 wherein said bimetallic element is attached to said rod at a first end thereof and at the second end thereof is adapted to engage at least a portion of said tube to prevent relative movement between said rod and said tube in response to a preselected ambient temperature, and to release said tube thereby facilitating relative movement between said rod and said tube in response to a preselected increase in ambient temperature.

14. The invention of claim 13 wherein said end of said bimetallic element which is adapted to engage at least a portion of said tube further comprises means for re-engaging said tube when said tube and said rod are moved through at least said predetermined position relative to each other.

* * * * *